United States Patent
Nigam et al.

(10) Patent No.: US 10,412,652 B2
(45) Date of Patent: Sep. 10, 2019

(54) APPARATUS AND METHOD FOR ROUTING DATA PACKET TO USER EQUIPMENT IN LTE-WLAN AGGREGATION SYSTEM

(71) Applicant: Samsung Electronics Co., Ltd., Suwon-si, Gyeonggi-do (KR)

(72) Inventors: Anshuman Nigam, Bangalore (IN); Ankur Chauhan, Bangalore (IN); Rangaraj Manavalan Karthik, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 15/328,260

(22) PCT Filed: Apr. 8, 2016

(86) PCT No.: PCT/KR2016/003713
§ 371 (c)(1),
(2) Date: Jan. 23, 2017

(87) PCT Pub. No.: WO2016/163808
PCT Pub. Date: Oct. 13, 2016

(65) Prior Publication Data
US 2017/0215122 A1  Jul. 27, 2017

(30) Foreign Application Priority Data

Apr. 10, 2015 (IN) .......................... 1891/CHE/2015
Apr. 7, 2016 (IN) .......................... 1891/CHE/2015

(51) Int. Cl.
*H04W 40/02* (2009.01)
*H04W 12/08* (2009.01)
(Continued)

(52) U.S. Cl.
CPC ............. *H04W 40/02* (2013.01); *H04L 45/74* (2013.01); *H04L 47/41* (2013.01); *H04L 69/22* (2013.01);
(Continued)

(58) Field of Classification Search
CPC ... H04W 28/0263; H04W 6/22; H04W 84/12; H04W 88/10
See application file for complete search history.

(56) References Cited

U.S. PATENT DOCUMENTS

2009/0046631 A1* 2/2009 Meylan ................. H04W 80/02
370/328
2012/0243462 A1* 9/2012 Bucknell ............... H04B 7/155
370/315
(Continued)

FOREIGN PATENT DOCUMENTS

WO   2014/160763 A1   10/2014

OTHER PUBLICATIONS

Qualcomm Incorporated, Introduction of LTE-WLAN Aggregation, R2-157095, 3GPP TSG-RAN WG2 Meeting #92, Anaheim, USA, Nov. 16-20, 2015.
(Continued)

*Primary Examiner* — Gary Mui
(74) *Attorney, Agent, or Firm* — Jefferson IP Law, LLP

(57) ABSTRACT

The present disclosure relates to a communication method and system for converging a 5th-generation (5G) communication system for supporting higher data rates beyond a 4th-generation (4G) system with a technology for internet of things (IoT). The present disclosure may be applied to intelligent services based on 5G communication technology and IoT-related technology, such as smart home, smart building, smart city, smart car, connected car, health care, digital education, smart retail, security and safety services.

(Continued)

A system and a method for routing a data packet to a user equipment (UE) in a long term evolution-wireless local area network (LTE-WLAN) aggregation are provided. The system includes an evolved node B (eNB) with a packet data convergence protocol (PDCP) adaptation layer that adds a header to the data packet.

22 Claims, 14 Drawing Sheets

(51) Int. Cl.
*H04W 80/02* (2009.01)
*H04W 88/10* (2009.01)
*H04W 28/02* (2009.01)
*H04L 12/741* (2013.01)
*H04L 12/891* (2013.01)
*H04L 29/06* (2006.01)
*H04W 84/12* (2009.01)

(52) U.S. Cl.
CPC ....... *H04W 12/08* (2013.01); *H04W 28/0263* (2013.01); *H04W 80/02* (2013.01); *H04W 88/10* (2013.01); *H04W 84/12* (2013.01)

(56) References Cited

U.S. PATENT DOCUMENTS

| | | | |
|---|---|---|---|
| 2013/0216043 A1 | 8/2013 | Ginzboorg et al. | |
| 2013/0242897 A1 | 9/2013 | Meylan et al. | |
| 2014/0092828 A1* | 4/2014 | Sirotkin | H04W 4/70 370/329 |
| 2014/0321376 A1 | 10/2014 | Damnjanovic et al. | |
| 2014/0369198 A1 | 12/2014 | Rinne et al. | |
| 2015/0003242 A1* | 1/2015 | Han | H04W 28/0268 370/230 |
| 2015/0195850 A1* | 7/2015 | Quan | H04L 1/18 370/329 |
| 2015/0264726 A1* | 9/2015 | Zhu | H04W 28/065 370/329 |
| 2016/0066362 A1* | 3/2016 | Ohta | H04W 16/32 370/331 |
| 2016/0135120 A1* | 5/2016 | Sirotkin | H04W 48/18 370/329 |
| 2016/0234726 A1* | 8/2016 | Nuggehalli | H04W 36/0022 |
| 2016/0234752 A1* | 8/2016 | Hsu | H04L 12/4641 |
| 2016/0255551 A1* | 9/2016 | Susitaival | H04W 36/023 370/334 |
| 2016/0302077 A1* | 10/2016 | Yi | H04W 76/15 |
| 2016/0302140 A1* | 10/2016 | Shaw | H04W 48/20 |
| 2016/0337958 A1* | 11/2016 | Fujishiro | H04W 4/00 |
| 2017/0048914 A1* | 2/2017 | Zeng | H04W 28/08 |
| 2017/0156041 A1* | 6/2017 | Zhang | H04W 4/20 |
| 2018/0014226 A1* | 1/2018 | Li | H04L 47/41 |
| 2018/0049063 A1* | 2/2018 | Xu | H04W 28/085 |

OTHER PUBLICATIONS

3GPP TS 36.360, V1.0.0, 3rd Generation Partnership Project; Technical Specification Group Radio Access Network; Evolved Universal Terrestrial Radio Access (E-UTRA); LTE-WLAN Aggregation Adaptation Protocol (LWAAP), specification (Release 13), Feb. 2016.

* cited by examiner

[Fig. 1]
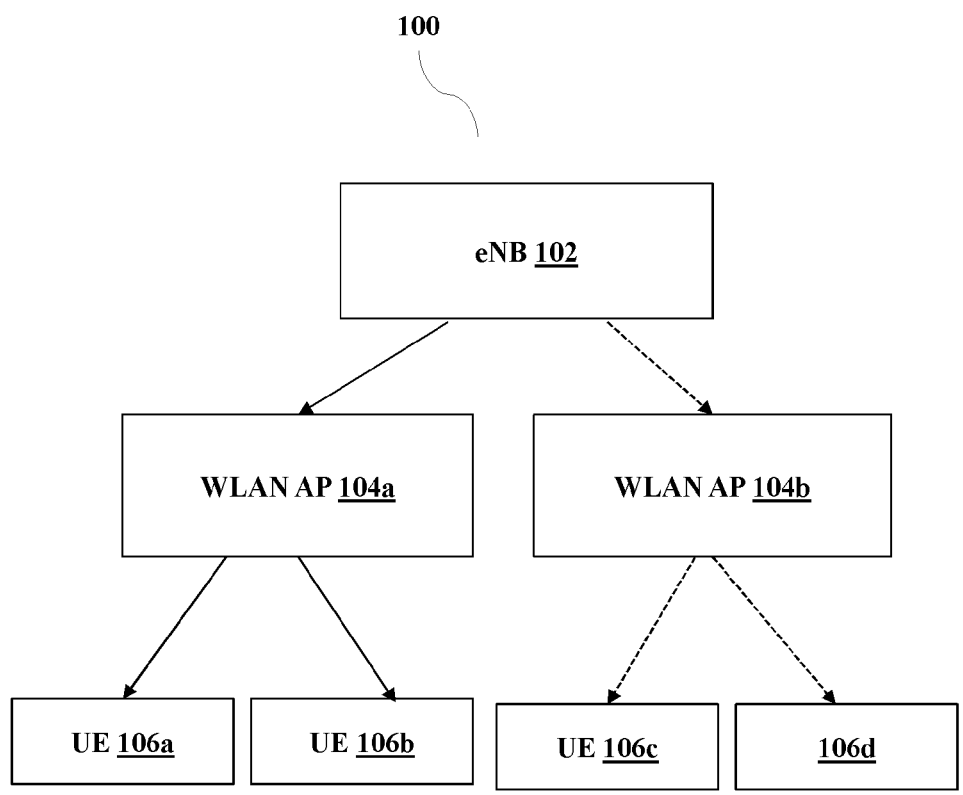

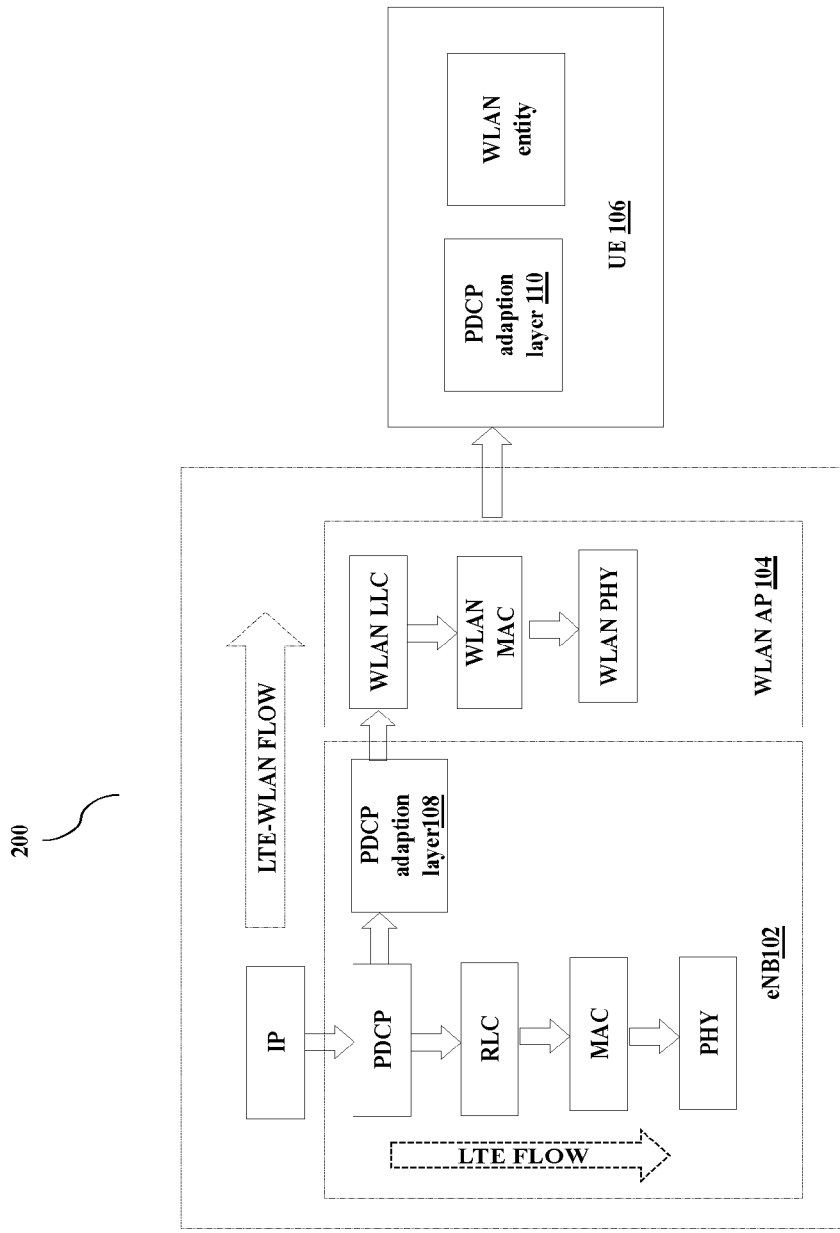
[Fig. 2]

[Fig. 3a]
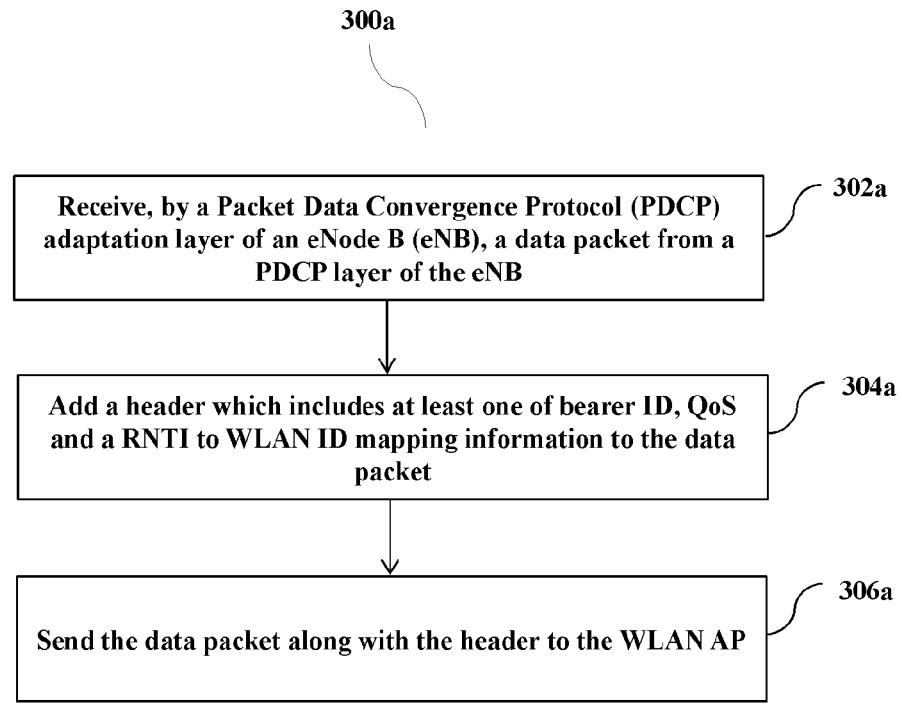
[Fig. 3b]
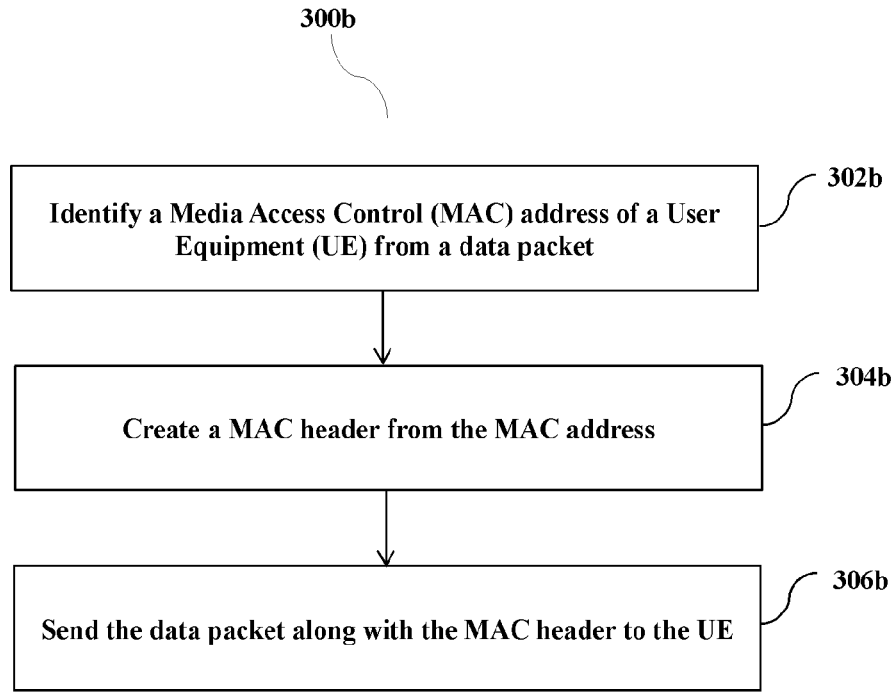

[Fig. 4]
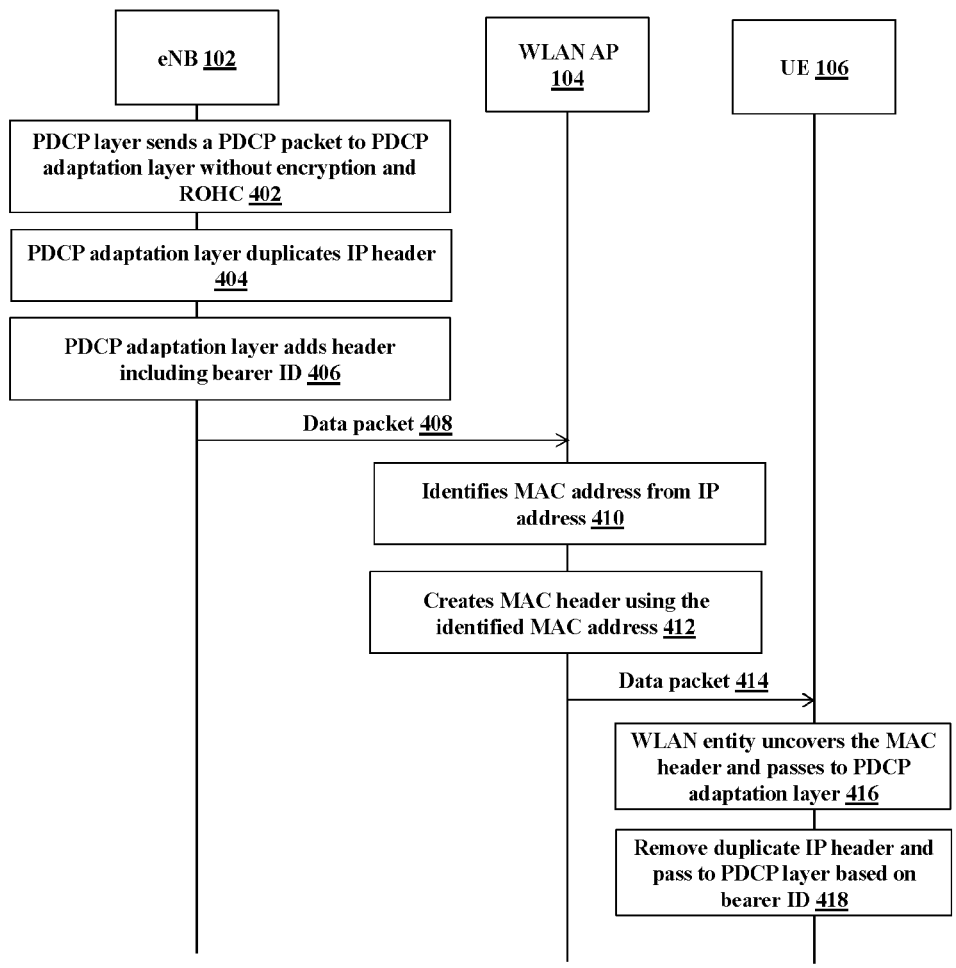

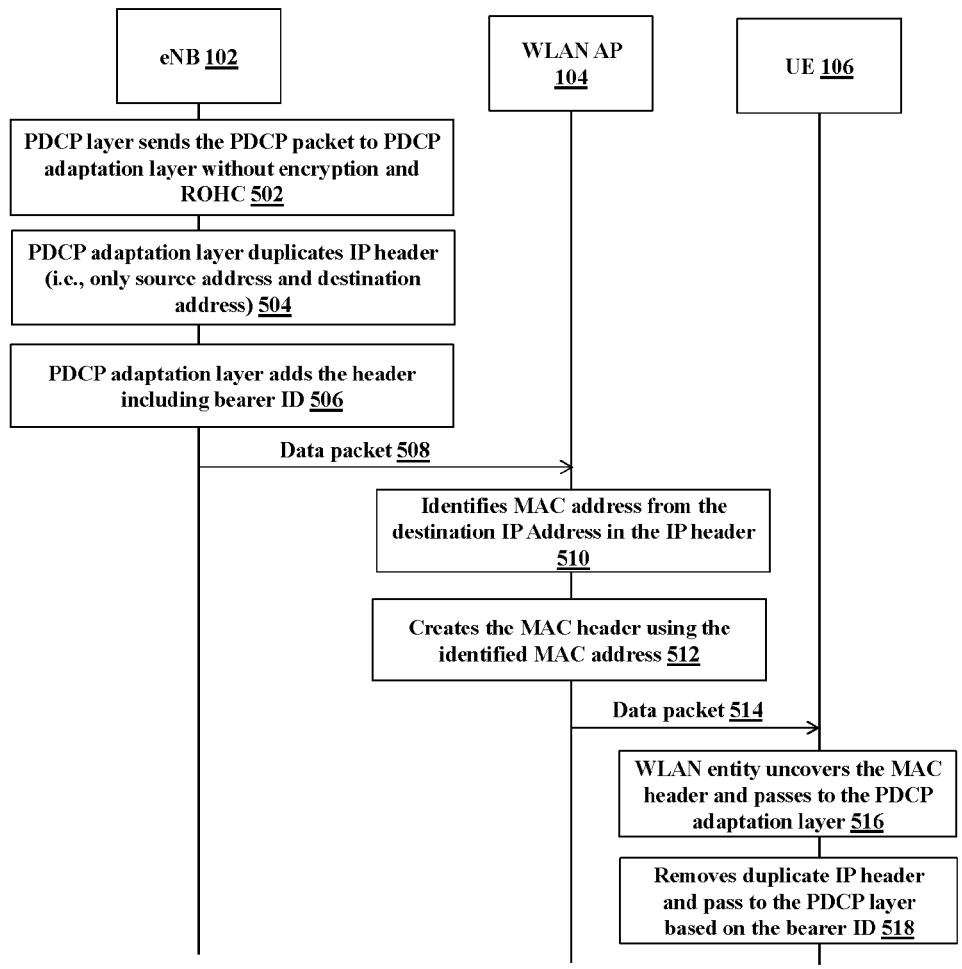
[Fig. 5]

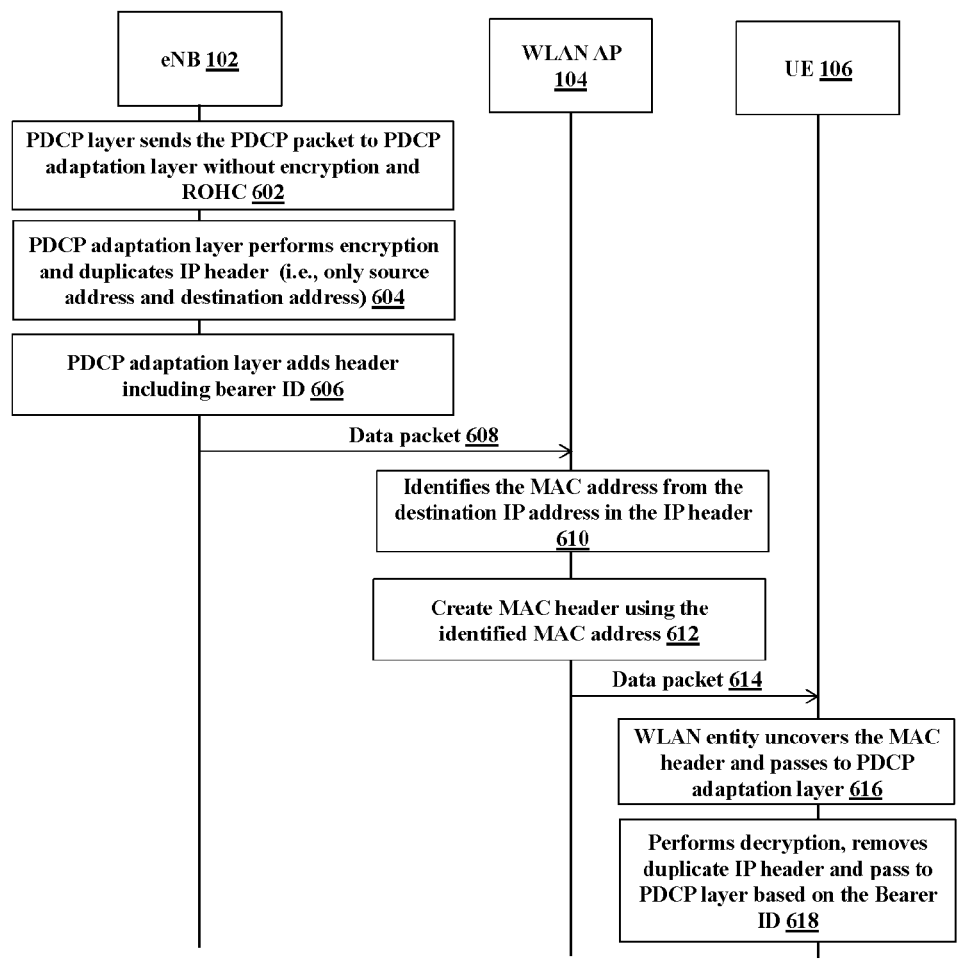

[Fig. 7]
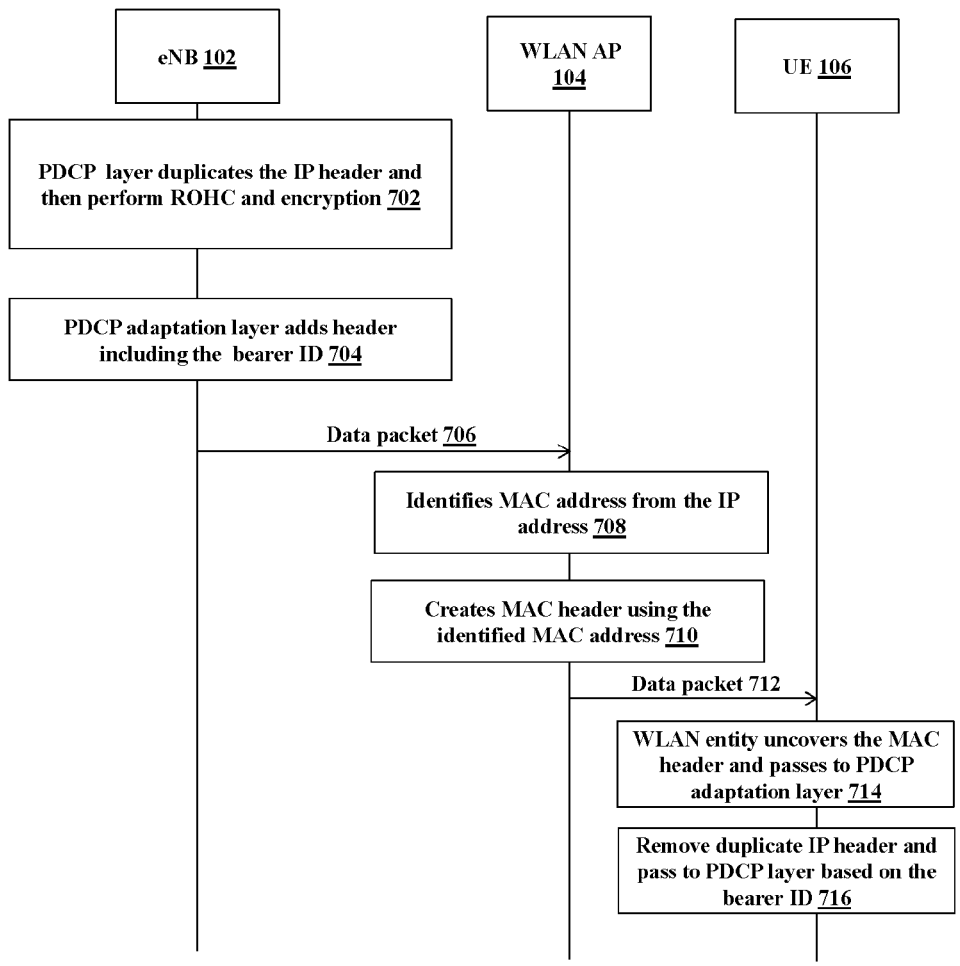

[Fig. 8]
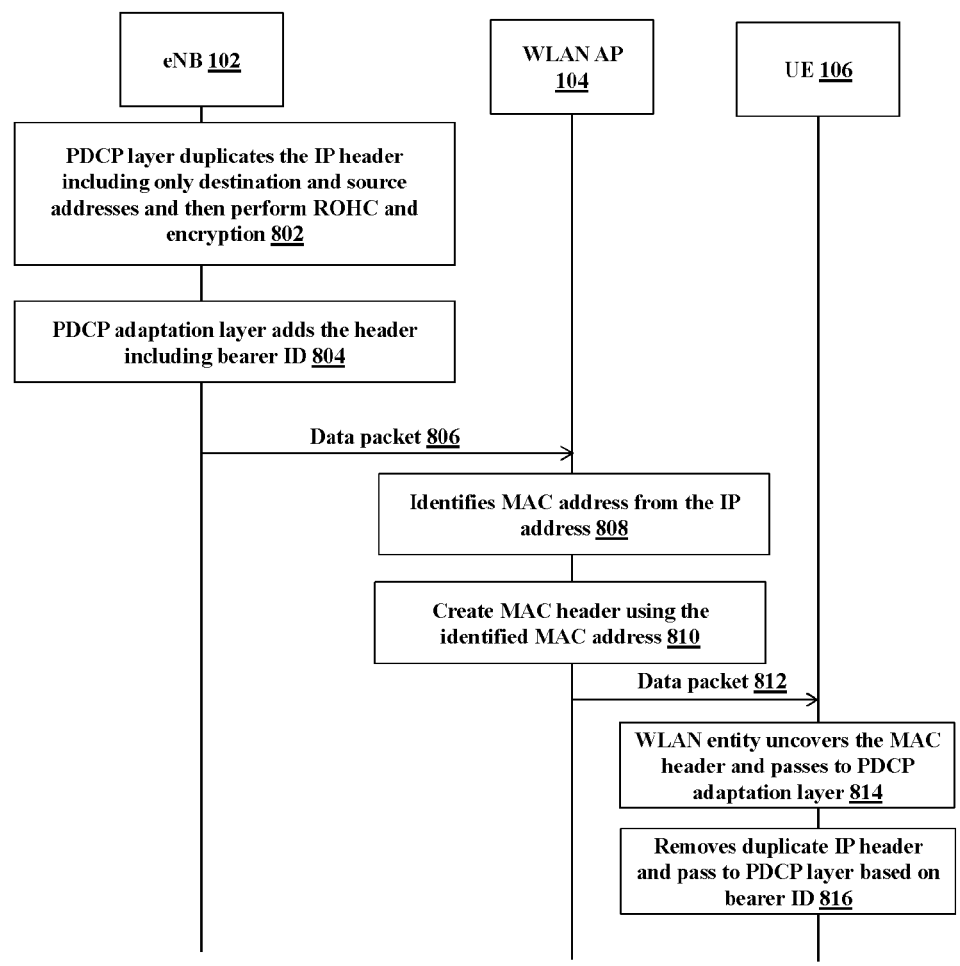

[Fig. 9]
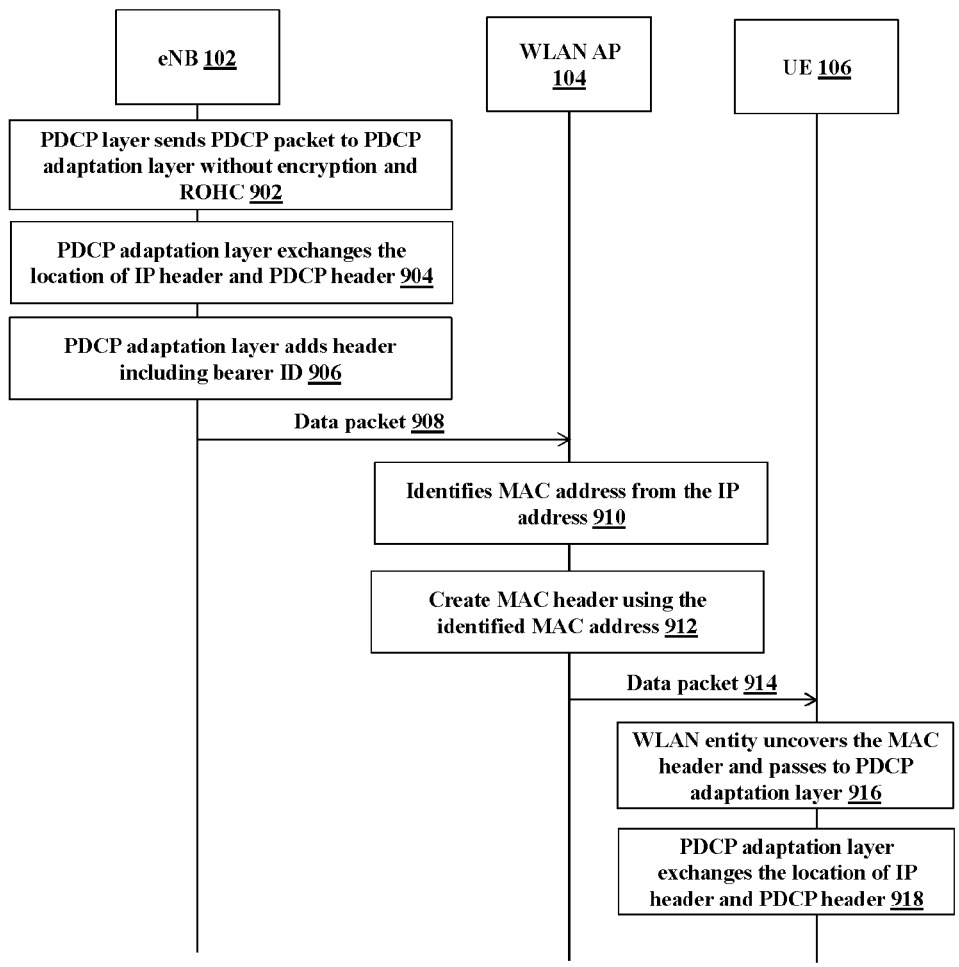

[Fig. 10]
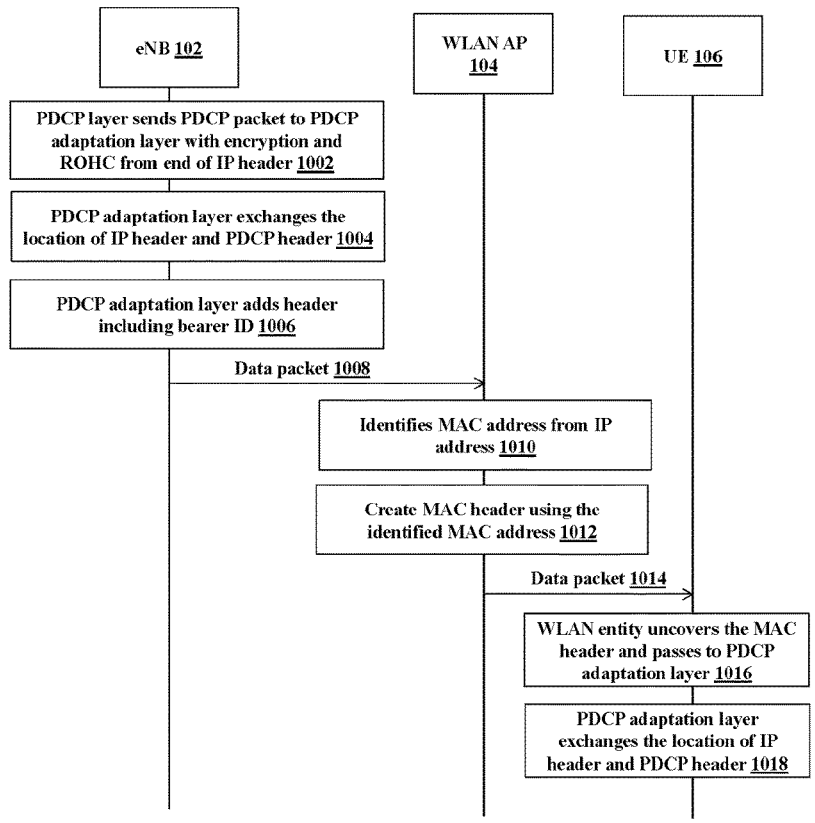
[Fig. 11]
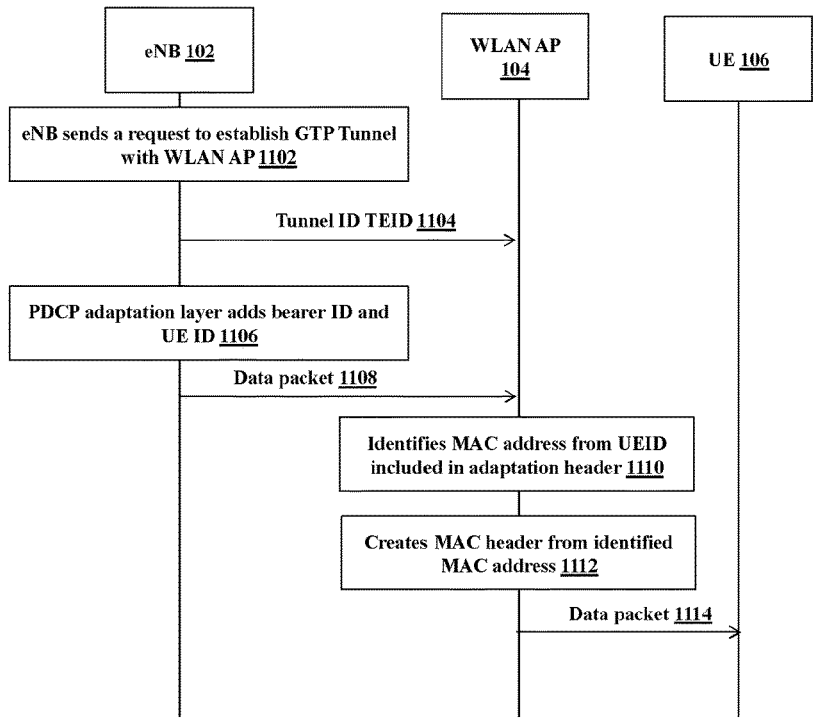

[Fig. 12]
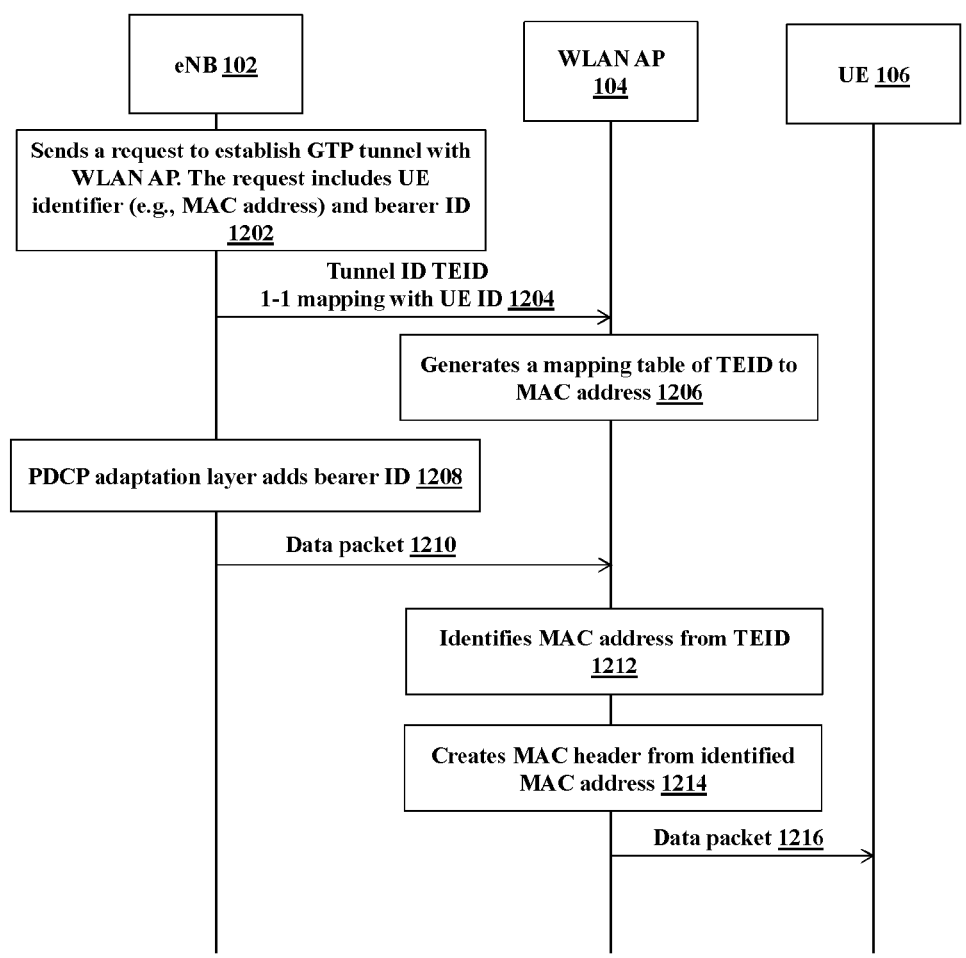

[Fig. 13]
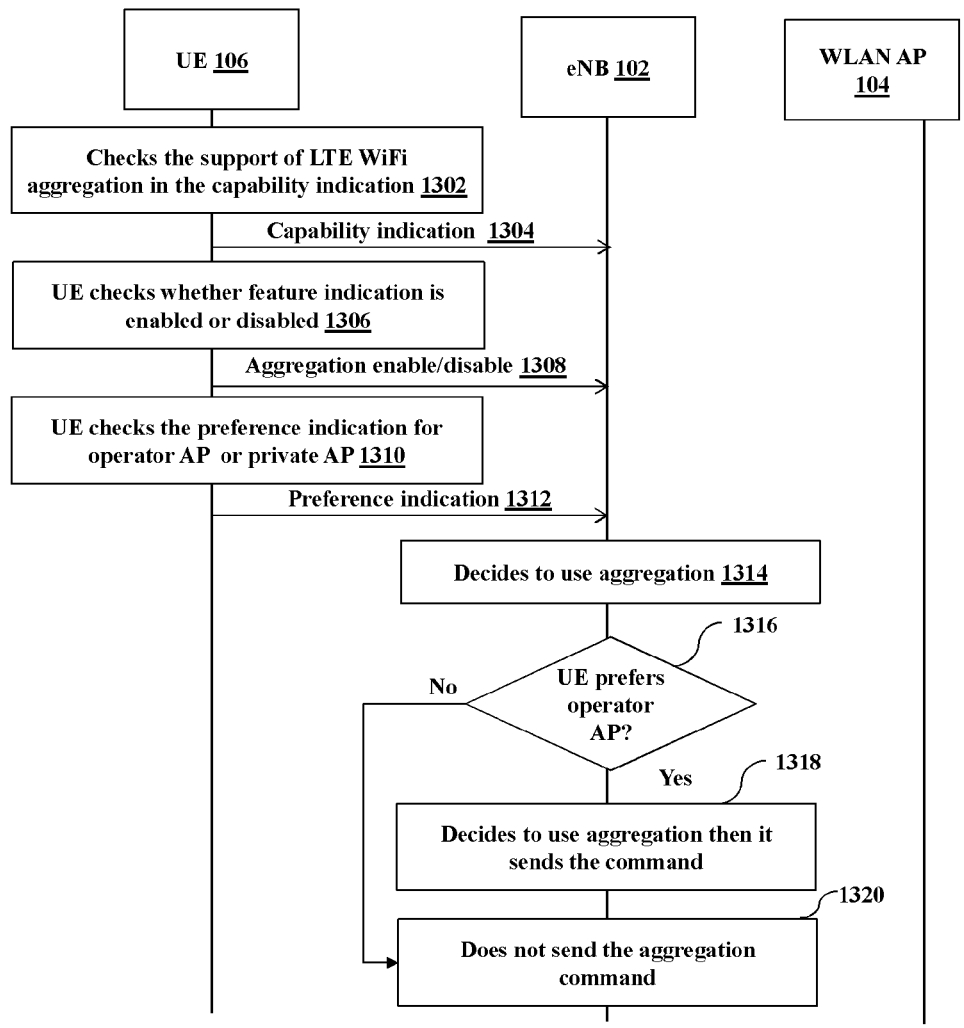

[Fig. 14]
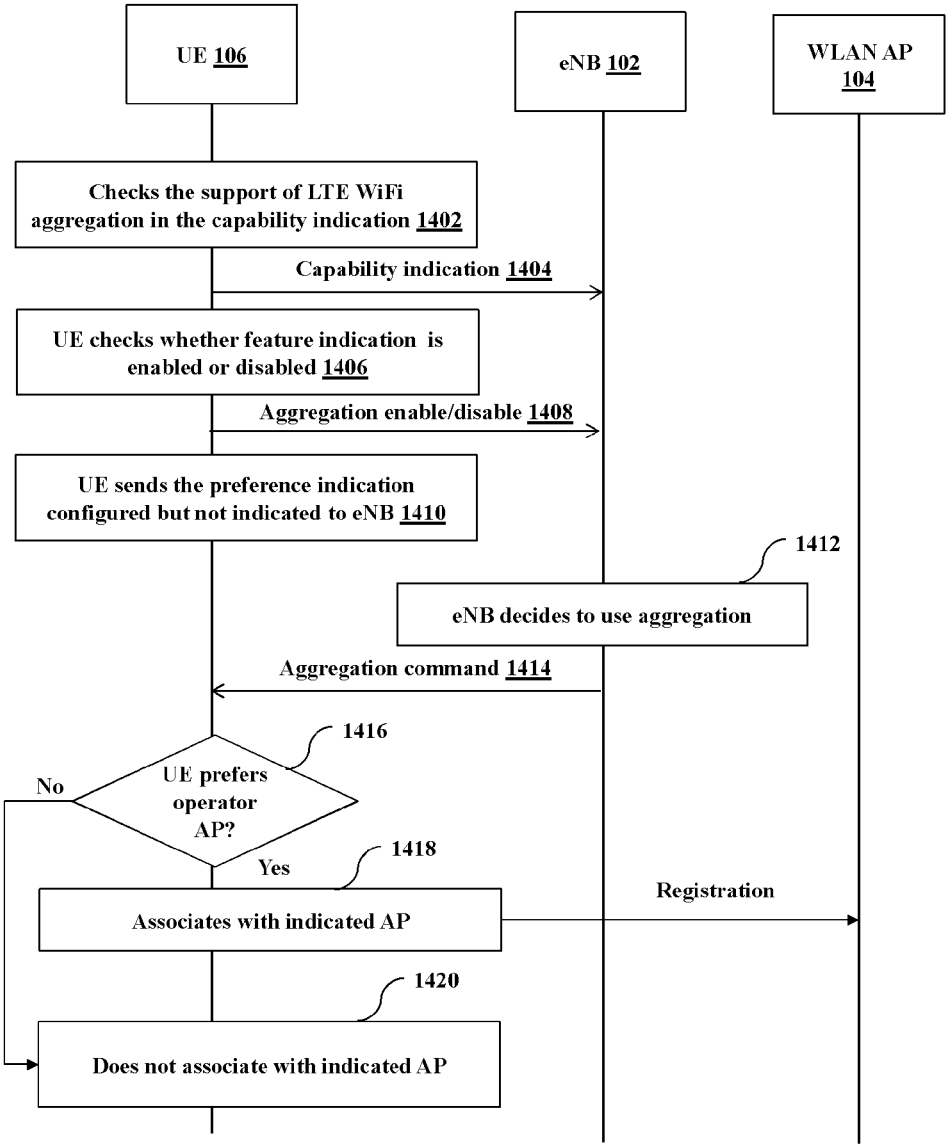
[Fig. 15]
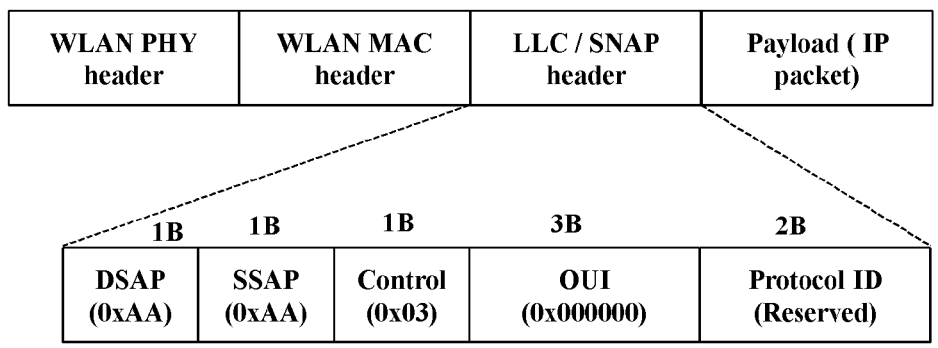

[Fig. 16]
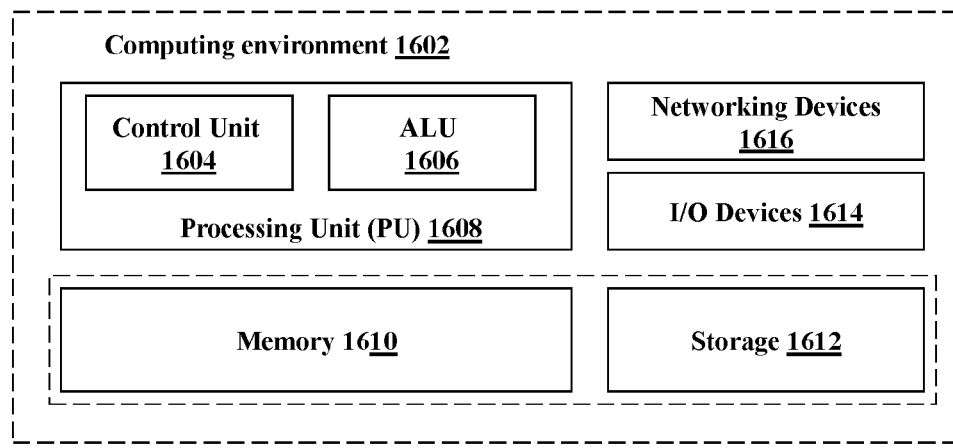

APPARATUS AND METHOD FOR ROUTING DATA PACKET TO USER EQUIPMENT IN LTE-WLAN AGGREGATION SYSTEM

CROSS-REFERENCE TO RELATED APPLICATION(S)

This application is a U.S. National Stage application under 35 U.S.C. § 371 of an International application filed on Apr. 8, 2016 and assigned application number PCT/KR2016/003713, which claimed the benefit of an Indian patent application filed on Apr. 10, 2015 in the Indian Patent Office and assigned Serial number 1891/CHE/2015, and of an Indian patent application filed on Apr. 7, 2016 in the Indian Patent Office and assigned Serial number 1891/CHE/2015, the entire disclosure of each of which is hereby incorporated by reference.

TECHNICAL FIELD

The present disclosure relates to a wireless communication. More particularly, the present disclosure relates to a mechanism for routing a data packet to a user equipment (UE) in a long term evolution-wireless local area network (LTE-WLAN) aggregation.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that generate a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, the third generation partnership project (3GPP) is working on an upcoming architecture where a LTE and a wireless local area network (WLAN) will be aggregated such that the LTE will control a transmission of packets over the WLAN. The WLAN access points (APs) will be hidden from a core network (CN) in the LTE; the associated evolved nodeB (eNB) will control the corresponding APs. In such an architecture where the LTE and the WLAN are aggregated such that the LTE controls the WLAN, one or more flows of one or more user equipment (UEs) associated with an LTE eNB can be either fully or partially diverted over the WLAN where the decision of routing the packets is determined by the eNB. In such the architecture, the way that the WLAN identifies the packets corresponding to the UE and flow of the UE is not yet addressed. This is of paramount importance because a receiver of the WLAN entity needs to route packets to the appropriate data plane entities of the associated UE. In the LTE, each flow (referred to as data radio bearer (DRB)) is handled by independent radio link control (RLC)/packet data convergence protocol (PDCP) entities, hence when the data packets are arriving at the receiver from the WLAN, it needs to be passed on to the correct data plane entity.

The WLAN APs will be hidden from the core network, the associated LTE eNB will control the corresponding WLAN APs. The 3GPP/WLAN radio interworking Release-12 solution enhances CN-based WLAN offload by improving user quality of experience (QoE) and network utilization and providing more control to operators. These improvements can be further enhanced by the LTE-WLAN aggregation system, similar to enhancements already available from existing LTE carrier aggregation and dual connectivity features. The LTE-WLAN aggregation system provides the following advantages. The WLAN access network becomes transparent to the CN. This provides the operator unified control and management of both 3GPP and WLAN networks as opposed to separately managing the 3GPP and WLAN networks. The aggregation and tight integration at radio level allows for real-time channel and load aware radio resource management across the WLAN and the LTE to provide significant capacity and QoE improvements.

The reliable LTE network can be used as a control and mobility anchor to provide the QoE improvements, minimize service interruption, and increase operator control. The WLAN-related CN signaling is eliminated. Thus results in reducing CN load in the LTE-WLAN aggregation system.

The above information is presented as background information only to assist with an understanding of the present disclosure. No determination has been made, and no assertion is made, as to whether any of the above might be applicable as prior art with regard to the present disclosure.

SUMMARY

The benefits of long term evolution-wireless local area network (LTE-WLAN) aggregation system can be realized in both co-located and non-collocated deployments. For the collocated case, corresponding to the small cell deployment, the LTE evolved nodeB (eNB) and WLAN access point (AP)/access controller (AC) are physically integrated and connected via an internal interface. This scenario is similar to the LTE carrier aggregation. For the non-collocated case, the LTE eNB and the WLAN are connected via an external interface. This scenario is similar to the LTE dual connectivity. In both collocated and non-collocated cases, the WLAN link behaves as second cell/carrier for data while the control is managed by the eNB through a radio resource control (RRC) entity.

However, existing mechanism fails to route a data packet to the user equipment (UE) in the LTE-WLAN aggregation system.

Aspects of the present disclosure are to address at least the above-mentioned problems and/or disadvantages and to provide at least the advantages descried below. Accordingly, an aspect of the present disclosure is to provide a method and system for routing a data packet to a UE in an LTE-WLAN aggregation.

Another aspect of the present disclosure is to provide a method for receiving, by a packet data convergence protocol (PDCP) adaptation layer of an eNB, a data packet from a PDCP layer.

Another aspect of the present disclosure is to provide a method for adding a header which includes at least one of bearer identification (ID), quality of service (QoS) and a radio network temporary identifier (RNTI) to WLAN ID mapping information to the data packet.

Another aspect of the present disclosure is to provide a method for sending a data packet along with a header to a WLAN AP.

In accordance with an aspect of the present disclosure, an apparatus for routing a data packet to a UE in an LTE-WLAN aggregation is provided. The apparatus includes an eNB having a PDCP adaptation layer configured to receive the data packet from a PDCP layer. The PDCP adaptation layer is configured to add a header to the data packet. The header includes at least one of bearer ID, QoS and an RNTI to WLAN ID mapping information to the data packet. The PDCP adaptation layer is configured to transmit the data packet along with the header to the WLAN AP.

In accordance with another aspect of the present disclosure, a method for routing, by an eNB, a data packet to a UE in an LTE-WLAN aggregation is provided. The method includes receiving, by a PDCP adaptation layer of the eNB, the data packet from a PDCP layer of the eNB, adding, by the PDCP adaptation layer, a header which includes at least one of bearer ID, QoS and an RNTI to WLAN ID mapping information to the data packet, and transmitting, by the PDCP adaptation layer, the data packet with the header to the WLAN AP.

In accordance with another aspect of the present disclosure, a method for routing, by a WLAN AP, a data packet to a UE in an LTE-WLAN aggregation is provided. The method includes identifying a media access control (MAC) address of a UE from a data packet, wherein the data packet is received from a PDCP adaptation layer of an eNB, generating a MAC header from the MAC address, and sending the data packet along with the MAC header to the UE.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates generally, among other things, a high level overview of a long term evolution-wireless local area network (LTE-WLAN) aggregation system for routing a data packet to a user equipment (UE) according to an embodiment of the present disclosure;

FIG. 2 illustrates a layer level implementation of the LTE-WLAN aggregation system as shown in FIG. 1 according to an embodiment of the present disclosure;

FIG. 3A is a flow diagram illustrating a method for routing a data packet to a UE by an evolved nodeB (eNB) in an LTE-WLAN aggregation system according to an embodiment of the present disclosure;

FIG. 3B is a flow diagram illustrating a method for routing a data packet to a UE by a WLAN access point (WLAN AP) in an LTE-WLAN aggregation system according to an embodiment of the present disclosure;

FIGS. 4, 5, 6, 7, 8, 9, and 10 show sequence diagrams indicating various operations and procedures involved in routing a data packet to a UE in an LTE-WLAN aggregation system according to various embodiments of the present disclosure;

FIG. 11 is a sequence diagram indicating various operations and procedures involved in establishing communication between an eNB and a WLAN AP using a UE specific tunnel identified (TEID) according to an embodiment of the present disclosure;

FIG. 12 is a sequence diagram indicating various operations and procedures involved in establishing communication between an eNB and a WLAN AP using a UE and flow specific TEID according to an embodiment of the present disclosure;

FIG. 13 is a sequence diagram indicating various operations and procedures involved for indicating a UE preference indication according to an embodiment of the present disclosure;

FIG. 14 is a sequence diagram indicating various operations and procedures involved for a UE preference configuration but not indicated to an eNB according to an embodiment of the present disclosure;

FIG. 15 is a schematic of packet format in which a WLAN AP distinguishes an upper layer according to an embodiment of the present disclosure; and FIG. 16 illustrates a computing environment implementing a mechanism for routing a data packet to a UE in a LTE-WLAN aggregation system according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein provide a long term evolution-wireless local area network (LTE-WLAN) aggregation system for routing a data packet to a user equipment (UE). The evolved node B (eNB) determines to route the data packet through a WLAN access point (WLAN AP) before sending the data packet to a packet data convergence protocol (PDCP) adaptation layer. The system includes an eNB having a PDCP adaptation layer configured to receive the data packet from a PDCP layer. The PDCP adaptation layer is configured to add a header to the data packet. The PDCP adaptation layer is configured to send the data packet with the header to the WLAN AP.

In an embodiment, the header includes a bearer identification (ID).

In an embodiment, the header includes quality of service (QoS) information.

In an embodiment, the header includes radio network temporary identifier (RNTI) to WLAN ID mapping information.

In an embodiment, the header includes a combination of bearer ID, QoS, and RNTI to WLAN ID mapping information.

In an embodiment, the WLAN AP is configured to identify a media access control (MAC) address of the UE from the data packet. The WLAN AP is configured to generate a MAC header from the MAC address, and send the data packet along with the MAC header to the UE.

In an embodiment, the UE includes a PDCP adaptation layer configured to identify data packet routed from the eNB based on the bearer ID.

In an embodiment, the PDCP adaptation layer is configured to generate duplicates of an internet protocol (IP) header in the IP packet received from the PDCP layer as a PDCP payload prior to addition of the header.

In an embodiment, the IP header includes a source IP address and a destination IP address. The PDCP adaptation layer is configured to generate duplicates of the IP header in the IP packet received from the PDCP layer where the IP header includes the source IP address and the destination IP address.

In an embodiment, the WLAN AP is configured to identify the MAC address from the destination IP address.

In an embodiment, the WLAN AP is configured to map the destination IP address to the MAC address of the UE.

In an embodiment, the eNB is configured to share the MAC address of the UE and the destination IP address of the UE to the WLAN AP.

In an embodiment, the UE is configured to directly share IP address of the UE to the WLAN AP.

In an embodiment, the PDCP adaptation layer is configured to encrypt the data packet prior to generate duplicates of the source IP address and the destination IP address. The PDCP adaptation layer is configured to send the encrypted data packet to the WLAN AP.

In an embodiment, the eNB is configured to establish a tunnel with the WLAN AP and the PDCP adaptation layer includes a UE ID along with the data packet. A tunnel ID is exchanged between the eNB and the WLAN AP.

In an embodiment, the tunnel is established based on at least one of an IP address of the UE and the MAC address of the UE. The UE shares the IP address of the UE to the WLAN AP or the MAC address of the UE to the LTE eNB.

In an embodiment, the WLAN AP is configured to identify the MAC address of the UE from the UE ID received in the tunnel ID.

In an embodiment, the WLAN AP is configured to check the QoS and route the data packet to the UE based on the QoS.

In an embodiment, the eNB determines to route the data packet through the WLAN AP based on at least one of support of aggregation capability information, aggregation feature enable information, aggregation feature disable information, and preference indication information received from the UE during registration.

In an embodiment, the eNB is configured to send an aggregation command including identity of the WLAN AP to the UE.

The embodiments herein provide a method for routing a data packet to a UE in a LTE-WLAN aggregation system. The method includes receiving, by a PDCP adaptation layer of an eNB, the data packet from a PDCP layer of the eNB. Further, the method includes adding, by the PDCP adaptation layer, a header which includes at least one of bearer ID, QoS and a RNTI to WLAN ID mapping information to the data packet. Further, the method includes sending, by the PDCP adaptation layer, the data packet with the header to the WLAN AP.

The embodiments herein provide a method implemented in a WLAN AP. The method includes identifying a MAC address of a UE from a data packet. The data packet is received from a PDCP adaptation layer of an eNB. Further, the method includes generating a MAC header from the MAC address, and sending the data packet along with the MAC header to the UE.

Referring now to the drawings and more particularly to FIGS. 1, 2, 3A, 3B, and 4 to 16, where similar reference characters denote corresponding features consistently throughout the figure, there are shown preferred embodiments.

FIG. 1 illustrates generally, among other things, a high level overview of an LTE-WLAN aggregation system 100 for routing a data packet to a UE 106 according to an embodiment of the present disclosure.

Referring to FIG. 1, the system 100 includes eNB 102, a plurality of WLAN APs 104a and 104b, a plurality of UEs 106a-106d.

In an embodiment, the WLAN AP 104a and the WLAN AP 104b is an operator AP.

In an embodiment, the WLAN AP 104a is an operator AP and the WLAN AP 104b is a private AP.

The eNB 102 may also be referred to as a base station, a base transceiver station, a radio base station, a radio transceiver, a transceiver function, a basic service set (BSS), an extended service set (ESS), or the like.

The UE 106 can be, for example but not limited to, a cellular phone, a tablet, a smart phone, a laptop, a personal digital assistant (PDA), or the like.

The eNB 102 is configured to add a header to the data packet. The header includes bearer ID, QoS and a RNTI to WLAN ID mapping information.

In an embodiment, the eNB 102 is configured to generate duplicates of an IP header prior to add the header.

In an embodiment, the IP header includes a source IP address and a destination IP address. The eNB 102 is configured to generate only duplicates of the source IP address and the destination IP address prior to add the header.

In an embodiment, the eNB 102 is configured to encrypt the data packet prior to generate duplicates of the source IP address and the destination IP address. The eNB 102 is configured to send the encrypted data packet to the WLAN AP 104.

By adding the header into the data packet, the eNB 102 is configured to send the data packet along with the header to the WLAN AP 104.

After receiving the data packet along with the header from the eNB 102, the WLAN AP 104 is configured to identify a MAC address of the UE 106 from the data packet. Further, the WLAN AP 104 is configured to generate a MAC header from the MAC address. After generating the MAC header, the WLAN AP 104 is configured to send the data packet along with the MAC header to the UE 106.

In an embodiment, the WLAN AP 104 is configured to identify the MAC address from the destination IP address. In an embodiment, the WLAN AP 104 is configured to map the destination IP address to the MAC address of the UE 106.

In an embodiment, the eNB 102 is configured to share the MAC address of the UE 106 and the destination IP address of the UE 106 to the WLAN AP 104. In an embodiment, the UE 106 is configured to directly share IP address of the UE 106 to the WLAN AP 104.

In an embodiment, in order to establish the communication between the eNB 102 and the WLAN AP 104, the eNB 102 is configured to establish a tunnel with the WLAN AP 104 using a UE ID. A tunnel ID is exchanged between the eNB 102 and the WLAN AP 104.

After receiving the data packet along with the MAC header from the WLAN AP 104, the UE 106 is configured to identify data packet routed from the eNB 102 based on the bearer ID.

In an embodiment, the eNB 102 differentiates the WLAN AP 104a and WLAN AP 104b based on IP address which are assigned by a LTE network.

Although FIG. 1 shows units of the system 100 but it is to be understood that other embodiments are not limited thereon. In other embodiments, the system 100 may include less or more number of WLAN APs and UEs. Further, the labels or names of the units are used only for illustrative purpose and does not limit the scope of the present disclosure. One or more units can be combined together to perform same or substantially similar function to route the data packet to the UE 106 in the LTE-WLAN aggregation.

FIG. 2 illustrates a layer level implementation of the LTE-WLAN aggregation system 200 as shown in FIG. 1 according to an embodiment of the present disclosure.

Referring to FIG. 2, the LTE-WLAN aggregation system 200 includes the eNB 102, the WLAN AP 104, and the UE 106. The eNB 102 includes a PDCP adaption layer 108, an IP layer, a PDCP layer, a radio link control (RLC) layer, a MAC layer, and a physical (PHY) layer. The WLAN AP 104 includes a WLAN logical link control (LLC) layer, a WLAN MAC layer, and a WLAN PHY layer. The UE 106 includes a PDCP adaption layer 110, and a WLAN entity.

In an embodiment, if the eNB 102 determines to route the data packet through the WLAN AP 104, a PDCP adaptation layer 108 in the eNB 102 is configured to receive the data packet from the PDCP layer.

After receiving the data packet from the PDCP layer, the PDCP adaptation layer 108 is configured to add the header to the data packet. The header includes at least one of the bearer ID, the QoS and the RNTI to WLAN ID mapping information.

In an embodiment, the PDCP adaptation layer 108 is configured to generate duplicates of the IP header received from the PDCP layer prior to add the header. In an embodiment, the IP header includes the source IP address and the destination IP address. The PDCP adaptation layer 108 is configured to generate duplicates of only the source IP address and the destination IP address.

In an embodiment, the PDCP adaptation layer 108 is configured to encrypt the data packet prior to generate duplicates of the source IP address and the destination IP address. The PDCP adaptation layer 108 is configured to send the encrypted data packet to the WLAN AP 104.

After adding the header into the data packet, the PDCP adaptation layer 108 is configured to send the data packet along with the header to the WLAN AP 104. Upon receiving the data packet along with the header from the eNB 102, the WLAN AP 104 is configured to identify the MAC address of the UE 106 from the data packet. Further, the WLAN AP 104 is configured to generate the MAC header from the MAC address. After generating the MAC header, the WLAN AP 104 is configured to send the data packet along with the MAC header to the UE 106.

FIG. 3A is a flow diagram illustrating a method 300a for routing the data packet to the UE 106 by the eNB 102 in the LTE-WLAN aggregation system 100 according to an embodiment of the present disclosure.

Referring to FIG. 3A, the operations 302a to 306a are executed by the PDCP adaptation layer 108 of the eNB 102. Initially, the eNB 102 determines to route the data packet through the WLAN AP 104. At operation 302a, the method 300a includes receiving the data packet from the PDCP layer of the eNB 102. At operation 304a, the method 300a includes adding the header to the data packet. The header has the bearer ID, the QoS and the RNTI to WLAN ID mapping information. At operation 306a, the method 300a includes sending the data packet with the header to the WLAN AP 104.

The various actions, acts, blocks, operations, or the like in the method 300a may be performed in the order presented, in a different order or simultaneously. Further, in some embodiments, some of the actions, acts, blocks, operations, or the like may be omitted, added, modified, skipped, or the like without departing from the scope of the present disclosure.

FIG. 3B is a flow diagram illustrating a method 300b for routing the data packet to the UE 106 by the WLAN AP 104 in the LTE-WLAN aggregation system 100 according to an embodiment of the present disclosure.

Referring to FIG. 3B, the operations 302b to 306b are performed by the WLAN AP 104. At operation 302b, the method 300b includes identifying the MAC address of the UE 106 from the data packet. The data packet is received from the PDCP adaptation layer 108 of the eNB 102. At operation 304b, the method 300b includes generating the MAC header from the MAC address. At operation 306b, the method 300b includes sending the data packet along with the MAC header to the UE 106.

The various actions, acts, blocks, operations, or the like in the method 300b may be performed in the order presented, in a different order or simultaneously. Further, in some embodiments, some of the actions, acts, blocks, operations, or the like may be omitted, added, modified, skipped, or the like without departing from the scope of the present disclosure.

FIGS. 4, 5, 6, 7, 8, 9, and 10 show a sequence diagram indicating various operations and procedures involved in routing the data packet to the UE 106 in the LTE-WLAN aggregation system 100 according to various embodiments of the present disclosure.

Referring to FIG. 4, the PDCP layer sends at operation 402 the PDCP packet to the PDCP adaptation layer 108 without encryption and robust header compression (ROHC). In an embodiment, the PDCP adaptation layer 108 duplicates at operation 404 the IP header which is present in a PDCP packet and appends the duplicated header before an adaptation header. The PDCP adaptation layer 108 adds at operation 406 the header to the PDCP packet received from the PDCP layer. The header includes the bearer ID. Further, the PDCP adaptation layer 108 identifies the start of the IP header based on the size of a PDCP header. In an embodiment, the PDCP layer sends the size of the PDCP header to the PDCP adaptation layer 108 or the size can be pre-defined in advance. In an embodiment, if the PDCP header is variable then the PDCP adaptation layer 108 parses the PDCP header to identify the length field and accordingly computes the length of the PDCP header. Thus, the PDCP adaptation layer 108 computes the start of the IP header where the start of the IP header is at an offset with respect to the start of PDCP packet it received such that the offset is equal to the length of the PDCP header. The PDCP adaptation layer 108 duplicates the IP header based on the start of the offset of the IP header and the length of IP header.

In an embodiment, the PDCP adaptation layer 108 adds IP header including the bearer ID to the IP packet. In an embodiment, the PDCP layer performs packet routing on receiving the IP packets from the upper layer (i.e., IP layer). Further, the eNB 102 sends at operation 408 the data packet to the WLAN AP 104.

After receiving the data packet from the eNB 102, the WLAN AP 104 identifies at operation 410 the MAC address from the IP address. Further, the WLAN AP 104 generates at operation 412 the MAC header using the identified MAC address. Further, the WLAN AP 104 sends at operation 414 the data packet along with the MAC header to the UE 106.

The PDCP adaptation layer 108 forwards the data packets to the WLAN AP 104. The WLAN AP 104 generates the MAC address based on the IP header (which is the first header in the packet that it receives from the PDCP adaptation layer 108) and further adds the MAC header with the MAC address in the MAC header. The WLAN AP 104 maintains a mapping of IP header to the MAC address.

The UE 106 includes a WLAN entity which uncovers at operation 416 the MAC header using legacy WLAN MAC procedures and passes the data packets to the PDCP adaptation layer 110. The PDCP adaptation layer 110 removes at operation 418 the duplicated IP header and parses the adaptation header. Based on the bearer ID present in the adaptation header, the WLAN entity routes the data packet to the corresponding entity (for example: PDCP layer of LTE) at the UE 106. The bearer ID corresponds to the PDCP flow between the eNB 102 and the UE 106.

Referring to FIG. 5, the PDCP layer sends at operation 502 the PDCP packet to the PDCP adaptation layer 108 without encryption and ROHC. The PDCP adaptation layer 108 duplicates at operation 504 only the source address and the destination address included in the IP header. The PDCP adaptation layer 108 adds at operation 506 the header including the bearer ID. The PDCP adaptation layer 108 sends at operation 508 the data packet along with the header to the WLAN AP 104. Once the WLAN AP 104 receives the data packet along with the header from the eNB 102, the WLAN AP 104 identifies at operation 510 the MAC address from the destination address included in the IP header and generates at operation 512 the MAC header using the identified MAC Address. The WLAN AP 104 sends at operation 514 the data packet along with the MAC header to the UE 106. The UE 106 receives the data packet along with the MAC header. The WLAN entity in the UE 106 uncovers at operation 516 the MAC header and passes the data packet to the PDCP adaptation layer 110. The PDCP adaptation layer 110 included in the UE 106 removes at operation 518) the duplicate IP header and passes to the PDCP layer based on the bearer ID.

Referring to FIG. 6, the PDCP layer sends at operation 602 the PDCP packet to the PDCP adaptation layer 108 without encryption and ROHC. The PDCP adaptation layer 108 duplicates at operation 604 only source address and the destination address included in the IP header.

In an embodiment, the PDCP adaptation layer 108 performs encryption as per the PDCP encryption functionality where the parameters required for encryption will be shared by the PDCP layer to the PDCP adaptation layer 108. The PDCP adaptation layer 108 excludes the appended duplicate IP header, the adaptation header and the PDCP header from the encryption.

In an embodiment, eNB 102 sends the UE ID and MAC address mapping to the WLAN AP 104 prior to sending the data packet. In an example, the UE ID is an international mobile subscriber identity (IMSI)/international mobile equipment identity (IMEI).

In an embodiment, the eNB 102 shares the UE ID and an association ID to the WLAN AP 104 so that the WLAN AP 104 generates the mapping table.

Further, the PDCP adaptation layer 108 adds at operation 606 the header including the bearer ID. The PDCP adaptation layer 108 sends at operation 608 the data packet along with the header to the WLAN AP 104. After receiving the data packet along with the header by the WLAN AP 104, the WLAN AP 104 identifies at operation 610 the MAC address from the destination address included in the IP header and generates at operation 612 the MAC header using the identified MAC address. The WLAN AP 104 sends at operation 614 the data packet along with the MAC header to the UE 106. The WLAN entity in the UE 106 receives the data packet along with the MAC header. The WLAN entity uncovers at operation 616 the MAC header and passes to the PDCP adaptation layer 110. The PDCP adaptation layer 110 removes at operation 618 the duplicate IP header and pass to the PDCP layer based on the bearer ID.

Referring to FIG. 7, the PDCP layer performs packet routing on receiving the IP packets from the upper layer (i.e., IP layer). The PDCP layer determines to route the data packet via the WLAN AP 104 then duplicates at operation 702 IP header and appends the duplicated IP header before the PDCP header. Then it performs normal PDCP functionality like ROHC and encryption on a PDCP payload. The data packet includes the duplicated IP header, the PDCP header and the data packet is sent to the PDCP adaptation layer 108. The PDCP adaptation layer 108 adds at operation 704 the adaptation header including the bearer ID in between the duplicated IP header and the PDCP header.

The PDCP adaptation layer 108 forwards at operation 706 the data packet to the WLAN AP 104. After receiving the data packet from the PDCP adaptation layer 108, the WLAN AP 104 identifies at operation 708 the MAC address based on the IP header (which is the first header in the data packet that it receives from the PDCP adaptation layer 108) and further generates at operation 710 the MAC header with the appropriate MAC addresses in the MAC header. The WLAN AP 104 maintains the mapping of the IP header to the MAC address. The WLAN AP 104 sends at operation 712 the data packet to the UE 106. The receiving WLAN entity at the UE 106 uncovers at operation 714 the MAC header using the legacy WLAN MAC procedures and then provides the data packets to the PDCP adaptation layer 110. The PDCP adaptation layer 110 removes at operation 716 the duplicated IP header and parses the adaptation header and based on the bearer ID present in the adaptation header routes the data packet to the appropriate entity (for example: PDCP layer of LTE) at the UE 106. In an embodiment, the PDCP adaptation layer 110 parses and removes only the adaptation header and then sends the data packet to the PDCP layer. The PDCP layer removes the duplicated IP header and then continues its normal PDCP functionality.

Referring to FIG. 8, if the PDCP layer determines to route the data packet via the WLAN AP 104, the PDCP layer duplicates at operation 802 the IP header including only the source address and the destination address and then perform ROHC and encryption. In an embodiment, the PDCP layer copies only the source and destination portions of the IP header and appends before the PDCP header. The PDCP adaptation layer 108 adds the header in between the duplicated IP header and the PDCP header. The PDCP adaptation layer 108 needs to identify the length of the IP header which can be pre-specified or informed to it by the PDCP layer.

In an embodiment, the PDCP adaptation layer 108 adds at operation 804 the header including the bearer ID. Further, the adaptation layer sends (806) the data packet along with the header to the WLAN AP 104.

Once the WLAN AP 104 receives the data packet along with the header, the WLAN AP 104 identifies at operation 808 the MAC address from the IP address and generates at operation 810 the MAC header using the identified MAC address. The WLAN AP 104 sends at operation 812 the data packet along with the MAC header to the UE 106. The WLAN entity included in the UE 106 uncovers at operation 814 the MAC header and passes to the PDCP adaptation layer 110. The PDCP adaptation layer 110 removes at operation 816 the duplicate IP header and passes to the PDCP layer based on the bearer ID.

Referring to FIG. 9, the PDCP layer performs the data packet routing on receiving the IP packets from the upper layer (i.e., IP layer). The PDCP layer sends at operation 902 the PDCP packet including the PDCP header to the PDCP adaptation layer 108. The PDCP adaptation layer 108 exchanges at operation 904 the IP header and the PDCP header location in the data packet. Then the PDCP adaptation layer 108 adds at operation 906 the adaptation header in between the IP header and the PDCP header.

Further, the PDCP adaptation layer 108 forwards at operation 908 the data packet to the WLAN AP 104. After receiving data packet by the WLAN AP 104, the WLAN AP 104 identifies at operation 910 the MAC address based on the IP header (which is in the first location of the data packet) and further generates at operation 912 the MAC header with the MAC addresses in the MAC header. It maintains the mapping of IP header to the MAC address. The WLAN AP 104 sends at operation 914 the data packet to the UE 106. The receiving WLAN entity at the UE 106 uncovers at operation 916 the MAC header using the legacy WLAN MAC procedures and then provides the data packet to the PDCP adaptation layer 110. The PDCP adaptation layer 110 removes at operation 918 exchanged position of the IP header and the PDCP header and uncovers the adaptation header and then forwards the data packet to the PDCP layer at the UE 106.

Referring to FIG. 10, the PDCP sends at operation 1002 the PDCP packet to the PDCP adaptation layer 108 with encryption and ROHC from end of the IP header. Based on the receiving the PDCP packet, the PDCP adaptation layer 108 exchanges at operation 1004 the location of the IP header and the PDCP header. Further, the PDCP adaptation layer 108 adds at operation 1006 the header including the bearer ID. The PDCP adaptation layer 108 sends at operation 1008 the data packet along with the header to the WLAN AP 104.

After receiving the data packet along with the header by the WLAN AP 104, the WLAN AP 104 identifies at operation 1010 the MAC address from the IP address and generates at operation 1012 the MAC header using the identified MAC address. Further, the WLAN AP sends at operation 1014 the data packet along with the MAC header to the UE 106. The WLAN entity uncovers at operation 1016 the MAC header and passes to the PDCP adaptation layer 110. The PDCP adaptation layer 110 exchanges at operation 1018 the location of IP header and the PDCP header.

FIG. 11 is a sequence diagram indicating various operations and procedures involved in establishing communication between the eNB 102 and the WLAN AP 104 using a UE specific tunnel identified (TEID) according to an embodiment of the present disclosure.

Referring to FIG. 11, the eNB 102 sends at operation 1102 a request to establish a general packet radio service (GPRS) tunneling protocol (GTP) tunnel with the WLAN AP 104. The tunnel ID is exchanged at operation 1104 between the eNB 102 and the WLAN AP 104. The PDCP adaptation layer 108 adds at operation 1106 the bearer ID and the UE ID. The PDCP adaptation layer 108 sends at operation 1108 the data packet with the header to the WLAN AP 104. Once the WLAN AP 104 receives the data packet along with the header, the WLAN AP 104 identifies at operation 1110 the MAC address from the UEID included in the adaptation header and generates at operation 1112 the MAC header from the identified MAC address. The WLAN AP sends at operation 1114 the data packet along with the MAC header to the UE 106.

In an embodiment, once the eNB 102 determines to route partial data packets or full data packets to the UE 106 over the associated WLAN AP 104, the eNB 102 establishes the GTP tunnel with the WLAN AP 104 where the TEID has one to one mapping with a UE identifier.

For example, the UE ID can be a temporary mobile station identifier (TMSI), the IMSI, the IP address assigned to the UE 106, association ID of the UE 106 with the WLAN AP 104 or any other UE identity that is used in a 3rd generation partnership project (3GPP) network.

In an embodiment, the WLAN AP 104 maintains the mapping table of the UE ID and the MAC address which helps the WLAN AP 104 to identify corresponding UE when a data packet is received from the eNB 102.

In an embodiment, the UE 106 shares the MAC address to the eNB 102 and the eNB 102 shares with the WLAN AP 104 while establishing the tunnel.

In an embodiment, the TEID is mapped to the MAC address of the UE 106. The WLAN AP 104 on the receiving data packets from the eNB 102 identifies the UE 106 (among plurality of UEs) to which the data packets be routed.

In an embodiment, the TEID can be mapped to other UE identities which in turn are mapped to the MAC address.

In an embodiment, the UE 106 shares the association ID with the eNB 102 after associating with the WLAN AP 104. The TEID can be mapped to association ID which the WLAN AP 104 initially generates a mapping table of association ID to MAC address of UEs.

In an embodiment, the TEID is mapped directly or indirectly to the MAC address, the PDCP adaptation header includes the bearer ID which helps the WLAN entity to sends the data packets to the PDCP adaptation layer 110.

The eNB 102 establishes the tunnel with the associated WLAN APs 104 where the tunnel is identified by the TEID which is not mapped to the UE ID. The data packets for all the UEs which have to be routed via the associated WLAN AP 104 will be sent to the WLAN AP 104 on the single tunnel.

In an embodiment, the adaptation header includes the UE ID which helps the WLAN AP 104 to identify the UE 106 and accordingly identify the corresponding MAC address of the UE 106.

In an embodiment, the adaptation header includes the MAC address of the UE 106 based on which the WLAN AP 104 generates the MAC header. In this scenario, the MAC address is reported by the UE 106 to the eNB 102. In an embodiment, the adaptation header includes any other UE IDs which is then mapped by the WLAN AP 104 to the corresponding MAC address. In an embodiment, the eNB 102 informs MAC address and the UE ID that is to be used in the adaptation header to the WLAN AP 104 before the eNB 102 sends the data packets to the WLAN AP 104.

In an embodiment, the eNB 102 identifies the WLAN AP 104 based on IP addresses of the WLAN AP 104 which are assigned by a LTE network.

In an embodiment, the WLAN AP 104 associates with the eNB 102 based on the IP address of the eNB 102.

In an embodiment, the eNB 102 identifies the WLAN AP 104 through the UE 106.

In an embodiment, the eNB 102 configures the UE 106 to report the result of scanning when both the eNB 102 and the WLAN AP 104 are in the vicinity to the UE 106.

Based on reports from the multiple UEs, the eNB 102 can build a list of WLAN APs which it can associate with for the LTE Wi-Fi aggregation.

FIG. 12 is a sequence diagram various operations and procedures involved in establishing communication between the eNB 102 and the WLAN AP 104 using the UE and flow specific TEID according to an embodiment of the present disclosure.

Referring to FIG. 12, in an embodiment, the eNB 102 sends at operation 1202 the request to establish the GTP tunnel with the WLAN AP 104. The request includes the UE identifier (e.g., MAC address) and the bearer ID. The TEID provides at operation 1204 one to one mapping with the UE ID. The WLAN AP 104 generates at operation 1206 the mapping table of TEID to the MAC address. The PDCP adaptation layer 108 adds at operation 1208 the bearer ID. The PDCP adaptation layer 108 sends at operation 1210 the data packet along with the header to the WLAN AP 104.

In an embodiment, the WLAN AP 104 applies the QoS if the header from PDCP adaptation layer 108 includes the QoS.

Further, the WLAN AP 104 identifies at operation 1212 the MAC address from the TEID. The WLAN AP 104 generates at operation 1214 the MAC header from identified MAC address and sends at operation 1216 the data packet along with the MAC header to the UE 106.

The eNB 102 establishes the GTP tunnel with the WLAN AP 104 where the mapping of TEID and the UE ID along with the bearer ID.

FIG. 13 is a sequence diagram indicating various operations and procedures involved for indicating the UE preference indication (i.e., one time indication to the eNB 102) according to an embodiment of the present disclosure.

Referring to FIG. 13, the UE preference indication can be provided based on an operator AP or a private AP. In an embodiment, the UE 106 checks at operation 1302 the support of LTE WLAN aggregation in the capability indication. The UE 106 sends at operation 1304 the capability indication to the eNB 102. In an embodiment, the UE 106 checks at operation 1306 the indication whether aggregation feature is enabled or disabled by the user. The UE 106 sends at operation 1308 the aggregation enable information/aggregation disable information to the eNB 102. In an embodiment, the UE 106 checks at operation 1310 the preference indication for the operator AP or the private AP. The UE 106 sends at operation 1312 preference indication to the eNB 102. Based on the indication information, the eNB 102 determines at operation 1314 to use the aggregation. The eNB 102 determines at operation 1316 whether the UE 102 prefers the operator AP. If the UE 102 prefers the operator AP then the eNB 102 determines at operation 1318 to use the aggregation and sends the command based on the aggregation. If the UE 106 does not prefer the operator AP then, the eNB 102 does not send at operation 1320 the aggregation command.

If UE preference is Operator AP:

a) the eNB 102 sends WLAN aggregation add command (Scell Addition)

b) the UE 106 performs association with indicated operator AP if the UE 106 not using the Wi-Fi (for the private WLAN AP)

c) the UE 106 performs disassociation with the current private AP and performs association with the indicated operator AP, if the UE 106 uses the Wi-Fi (for the private WLAN AP)

If UE preference is Private:

Procedure A:

1) If the Wi-Fi in use (for the private AP) then the eNB 102 does not send the aggregation command 2) If Wi-Fi not in use (for the private AP) then the eNB 102 sends the aggregation command a) the eNB 102 detects the Wi-Fi usage based on "Wi-Fi Status Indication" which is sent by the UE 106 before the eNB 102 sends the aggregation command Procedure B:

The eNB sends aggregation command irrespective of the Wi-Fi status:

The UE 106 displays the command to the user via the UI
If the user agrees to perform the Wi-Fi aggregation then the UE 106 performs association with the indicated operator AP
If the Wi-Fi is in use then the UE 106 first performs dis-association
Procedure C:
If the Wi-Fi is in use then the eNB 102 sends the "Interest Indication"
The UE indicates the Wi-Fi Status to the eNB 102 after the UE 106 dis-associates with the AP
This may happen at a later time
This may also be a time limited behavior
UE sends the status if the Wi-Fi status becomes "not in use" within a configured time
This option can also be covered by the "Wi-Fi Status Indication" if these indications are sent every time Wi-Fi status changes (not only on the eNB request)
Alternatively, the eNB 102 can send the aggregation command again after some time
If UE preference is selected list of Private APs
a) If the Wi-Fi is in use with one of the APs in the list of "Prioritized Preferred Private APs then the eNB 102 does not sends the aggregation command
(i) the eNB 102 detects the list of prioritized preferred APs FIG. 14 is a sequence diagram indicating various operations and procedures involved for the UE preference configuration but not indicated to the eNB 102 according to an embodiment of the present disclosure.

Referring to FIG. 14, in an embodiment, the UE 106 checks at operation 1402 the support of LTE Wi-Fi aggregation in the capability indication. The UE 106 sends at operation 1404 the capability indication to the eNB 102. In an embodiment, the UE 106 checks at operation 1406 the indication whether aggregation feature is enabled or disabled. The UE 106 sends at operation 1408 the aggregation enable information or the aggregation disable information) to the eNB 102. In an embodiment, the UE 106 sends at operation 1410 the preference indication configured but not indicated to the eNB 102. The eNB 102 determines at operation 1412 to use the aggregation. The eNB 102 sends at operation 1414 the aggregation command to the UE 106. The UE 102 itself determines at operation 1416 prefer operator AP. If the UE prefers the operator AP then, the UE 106 associates at operation 1418 with the indicated AP. If the UE does not prefer the operator AP then, the UE does not associate at operation 1420 with the indicated AP.

UE preference is configured based on the user selection via the UI
It is not indicated to the eNB 102
the eNB 102 determines to configure the aggregation AP then it sends the aggregation command
The UE 106 performs action based on the user configured UE preference for accepting or rejecting the command
In an embodiment, the UE 106 can configure its preference of the private APs or the operator aggregation APs based on the user input. The UE 106 can indicate this preference to the eNB 102 in advance and the eNB 102 can accordingly determines to configure the aggregation AP. The eNB 102 can determine whether the Wi-Fi is in use or not at the UE 106. The UE 106 can send this Wi-Fi status indication based on the request from the eNB 102 before the eNB 102 commands the UE 106 to configure the AP for aggregation. In an example, if the UE 106 has indicated its preference of operator aggregation APs then the eNB 102 can configure the aggregation AP without worrying about the Wi-Fi status at the UE 106. The UE 106 will have to disassociate with it and associate with the indicated operator AP for the aggregation, if the UE 106 is connected to the private AP.

In an embodiment, the UE 106 does not configure its preference of the private APs or operator aggregation APs but when the eNB 102 sends the command to aggregate indicated operator AP, then the UE 106 prompts the user to accept or reject the aggregation through the user interface. The UE 106 acts according to the user selection for accepting or rejecting the aggregation.

The below table shows the UE preference indication.

TABLE 1

| User preference configured and indicated to eNB 102 | eNB sends aggregation command based on user preference and Wi-Fi Status at UE 106 | If Private AP > operator AP AND Wi-Fi Status is in use then do not send Aggregation Command If Op AP > Private AP then send Aggregation Command irrespective of Wi-Fi Status |
|---|---|---|
| User Preference Configured but NOT Indicated to eNB | eNB sends Aggregation Command without considering user preference or Wi-Fi Status at UE | |
| | UE acts based on Configured User Preference | If Private AP > Op AP then reject the command If Op AP > Private AP then accept the command |
| User Preference NOT Configured in advance | eNB sends Aggregation Command without considering user preference or Wi-Fi Status at UE UE prompts user for accepting/rejecting the aggregation | |
| | UE acts based on user input | If user agrees then accept else reject the command |

FIG. 15 is a schematic of data packet format in which a WLAN AP distinguishes the upper layer according to an embodiment of the present disclosure.

Referring to FIG. 15, a new value of protocol ID field in a subnetwork access protocol (SNAP) extension header can be used to identify that the data packet is from the LTE. A reserved value of protocol ID can be used to identify the data packets from the LTE network. In an embodiment, the PDCP forms the data packet and sends to the PDCP adaptation layer 108, if the PDCP determines to route the data packet via the WLAN AP 104. The PDCP adaptation layer 108 generates the LLC/SNAP header with appropriate fields and sends the data packet to the AP. The AP on receiving the data packet can identify based on the SNAP header that the data packet is from the LTE and processes it accordingly in which, the WLAN AP 104 generates the MAC header based on the tunnel ID generated or based on the adaptation header if the MAC address or association ID is included in the adaptation header.

In an embodiment, the encryption in the LTE network is not performed for the data packets which are to be routed via the WLAN. The eNB 102 can configure the WLAN to always perform encryption. The eNB 102 can also configure the encryption scheme to use among the ones available at the WLAN AP 104.

When the eNB 102 establishes the tunnel with the WLAN AP 104 for routing the packets to the UE 106, where the TEID is one to one mapped to the UE ID, the eNB 102 also indicates the access category of the packets. In an embodiment, the eNB 102 can also indicate the parameters of the indicated access category for example, if video traffic is routed via the WLAN AP 104, then the eNB 102 can indicate a CW value which the WLAN AP 104 should follow for the data. In addition, the PDCP adaptation layer 108 can form the traffic ID (TID) to select a user priority (UP) for prioritized QoS or a traffic specification (TSPEC) for the parameterized QoS. In an embodiment, the adaptation header includes the QoS access class so that the WLAN AP 104 can process the data packet based on the QoS. In an embodiment, the adaptation header includes the bearer ID and the WLAN AP 104 maps to the access class based on the tunnel establishment.

In an embodiment, when the eNB 102 establishes the tunnel with the WLAN AP 104 for routing the packets to the UE 106 where the TEID is one to one mapped to the UE ID and the bearer ID, the eNB 102 also indicates the access category of the packets. The eNB 102 can also indicate the parameters of the indicated access category for example, if the video traffic is routed via the WLAN AP 104, then the eNB 102 can indicate the CW value which the AP should follow for the data.

Based on the QoS mapping from the 3GPP service or QCI to 15 802.11 QoS, the eNB 102 can instruct the UE 106 to send an add traffic stream (ADDTS) request frame to the WLAN AP 104. The eNB 102 can provide the UE 106 with the set of parameters necessary to identify various kinds of PDU or incoming MAC service data unit (MSDU) that belong to the particular TS in a TCLAS element. In addition, the WLAN AP 104 forms the TSPEC element which includes parameters like service start time, minimum data rate, mean data rate and peak data rate or the like. The WLAN AP 104 responds with the ADDTS response frame based on the available resources.

In an embodiment, the eNB 102 can instruct the WLAN AP 104 to include the upper layer protocol identification (U-PID) to indicate to the UE 106 that the data packet is from the PDCP.

FIG. 16 illustrates a computing environment 1602 implementing a mechanism for routing the data packet to the UE 106 in the LTE-WLAN aggregation system 100 according to an embodiment of the present disclosure.

Referring to FIG. 16, the computing environment 1602 comprises at least one processing unit 1608 (e.g. processor) that is equipped with a control unit 1604, an arithmetic logic unit (ALU) 1606, a memory 1610, a storage unit 1612, a plurality of networking devices 1616 and a plurality input output (I/O) devices 1614. The processing unit 1608 is responsible for processing the instructions of the technique. The processing unit 1608 receives commands from the control unit 1604 in order to perform its processing. Further, any logical and arithmetic operations involved in the execution of the instructions are computed with the help of the ALU 1606.

The overall computing environment 1602 can be composed of multiple homogeneous or heterogeneous cores, multiple CPUs of different kinds, special media and other accelerators. The processing unit 1608 is responsible for processing the instructions of the technique. Further, the plurality of processing units 1604 may be located on a single chip or over multiple chips.

The technique comprising of instructions and codes required for the implementation are stored in either the memory unit 1610 or the storage 1612 or both. At the time of execution, the instructions may be fetched from the corresponding memory 1610 or storage 1612, and executed by the processing unit 1608.

In case of any hardware implementations various networking devices 1616 or external I/O devices 1614 may be connected to the computing environment 1602 to support the implementation through the networking unit and the I/O device unit. Further, a communication unit (not shown) is configured for communicating internally between internal units and with external devices via one or more networks.

The embodiments disclosed herein can be implemented through at least one software program running on at least one hardware device and performing network management functions to control the elements. The elements shown in FIGS. 1, 2, 3A, 3B, and 4 to 16 include blocks, elements, actions, acts, operations, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of the present disclosure as defined by the appended claims their equivalents.

The invention claimed is:

1. A method of transmitting data by a base station in a wireless communication system, the method comprising:
   receiving, from a user equipment (UE), capability information indicating whether a long term evolution-wireless local area network (LTE-WLAN) aggregation is supported by the UE; and
   if the LTE-WLAN aggregation is supported by the UE and the LTE-WLAN aggregation is enabled for the UE:
      generating data to which a header is added, wherein the header comprises a bearer identification (ID) for identifying an upper layer in the UE to which the data is destined, and
      transmitting the data to the UE by using the LTE-WLAN aggregation.

2. The method of claim 1, wherein the capability information is received by radio resource control (RRC) signaling.

3. The method of claim 1, wherein the transmitting comprises:
   transmitting the data to the UE via a WLAN access point (AP).

4. The method of claim 3, further comprising:
   establishing a tunnel with the WLAN AP based on at least one of an IP address of the UE or a MAC address of the UE,
   wherein a tunnel ID is exchanged between the eNB and the WLAN AP.

5. The method of claim 1, wherein the header comprises at least one of a quality of service (QoS) or information for mapping a radio network temporary identifier (RNTI) to WLAN ID.

6. The method of claim 1, wherein the upper layer is a packet data convergence protocol (PDCP) layer.

7. A base station in a wireless communication system, the base station comprising:
- a transceiver; and
- at least one processor coupled with the transceiver and configured to:
  - receive, from a user equipment (UE), capability information indicating whether a long term evolution-wireless local area network (LTE-WLAN) aggregation is supported by the UE, and
  - if the LTE-WLAN aggregation is supported by the UE and the LTE-WLAN aggregation is enabled for the UE:
    - generate data to which a header is added, wherein the header comprises a bearer identification (ID) for identifying an upper layer in the UE to which the data is destined, and
    - transmit the data to the UE by using the LTE-WLAN aggregation.

8. The base station of claim 7, wherein the capability information is received by radio resource control (RRC) signaling.

9. The base station of claim 7, wherein the at least one processor is further configured to transmit the data to the UE via a WLAN access point (AP).

10. The base station of claim 9,
wherein the at least one processor is further configured to establish a tunnel with the WLAN AP based on at least one of an IP address of the UE or a MAC address of the UE, and
wherein a tunnel ID is exchanged between the eNB and the WLAN AP.

11. The base station of claim 7, wherein the header comprises at least one of a quality of service (QoS) or information for mapping a radio network temporary identifier (RNTI) to WLAN ID.

12. The base station of claim 7, wherein the upper layer is a packet data convergence protocol (PDCP) layer.

13. A method of receiving data by a user equipment (UE) in a wireless communication system, the method comprising:
- transmitting, to a base station, capability information indicating whether a long term evolution-wireless local area network (LTE-WLAN) aggregation is supported by the UE; and
- if the LTE-WLAN aggregation is supported by the UE and the LTE-WLAN aggregation is enabled for the UE, receiving data to which a header is added from the base station by using the LTE-WLAN aggregation,
- wherein the header comprises a bearer identification (ID) for identifying an upper layer in the UE to which the data is destined.

14. The method of claim 13, wherein the capability information is transmitted by radio resource control (RRC) signaling.

15. The method of claim 13, wherein the receiving of the data packet comprises:
- receiving the data from the base station via a WLAN access point (AP).

16. The method of claim 13, wherein the header comprises at least one of a quality of service (QoS) or information for mapping a radio network temporary identifier (RNTI) to WLAN ID.

17. The method of claim 13, wherein the upper layer is a packet data convergence protocol (PDCP) layer.

18. A user equipment (UE) in a wireless communication system, the UE comprising:
- a transceiver; and
- at least one processor coupled with the transceiver and configured to:
  - transmit, to a base station, capability indication indicating whether a long term evolution-wireless local area network (LTE-WLAN) aggregation is supported by the UE, and
  - if the LTE-WLAN aggregation is supported by the UE and the LTE-WLAN aggregation is enabled for the UE, receive data to which a header is added from the base station by using the LTE-WLAN aggregation,
- wherein the header comprises a bearer identification (ID) for identifying an upper layer in the UE to which the data is destined.

19. The UE of claim 18, wherein the capability information is transmitted by radio resource control (RRC) signaling.

20. The UE of claim 18, wherein the at least one processor is further configured to receive the data from the base station via a WLAN access point (AP).

21. The UE of claim 18, wherein the header comprises at least one of a quality of service (QoS) or information for mapping a radio network temporary identifier (RNTI) to WLAN ID.

22. The UE of claim 18, wherein the upper layer is a packet data convergence protocol (PDCP) layer.

* * * * *